(12) United States Patent
Boden et al.

(10) Patent No.: US 7,118,830 B1
(45) Date of Patent: Oct. 10, 2006

(54) BATTERY PASTE ADDITIVE AND METHOD FOR PRODUCING BATTERY PLATES

(75) Inventors: David Paul Boden, Ruckersville, VA (US); Benjamin Paul Labovitz, Valparaiso, IN (US)

(73) Assignee: Hammond Group, Inc., Hammond, IN (US)

( * ) Notice: Subject to any disclaimer, the term of this patent is extended or adjusted under 35 U.S.C. 154(b) by 139 days.

(21) Appl. No.: 10/806,922

(22) Filed: Mar. 23, 2004

(51) Int. Cl.
 *H01M 4/20* (2006.01)
 *H01M 4/56* (2006.01)
 *H01M 4/58* (2006.01)
 *C01G 21/20* (2006.01)

(52) U.S. Cl. .................. 429/227; 429/228; 423/559; 29/2

(58) Field of Classification Search .................. None
See application file for complete search history.

(56) References Cited

U.S. PATENT DOCUMENTS

| | | |
|---|---|---|
| 3,765,943 A | 10/1973 | Biagetti |
| 3,881,954 A | 5/1975 | Maskalick |
| 3,973,991 A | 8/1976 | Cestaro et al. |
| 4,331,516 A | 5/1982 | Meighan |
| 4,336,236 A | 6/1982 | Kolakowski et al. |
| 4,338,163 A | 7/1982 | Rittenhouse |
| 4,381,250 A | 4/1983 | Rittenhouse |
| 4,401,730 A | 8/1983 | Szymborski et al. |
| 4,415,410 A | 11/1983 | Reich |
| 4,507,372 A | 3/1985 | Rowlette |
| 4,713,304 A | 12/1987 | Rao et al. |
| 4,735,870 A | 4/1988 | Rowlette |
| 4,758,372 A | 7/1988 | Eirich et al. |
| 4,889,778 A | 12/1989 | Misra et al. |
| 4,982,482 A | 1/1991 | Wheadon et al. |
| 4,986,317 A | 1/1991 | Takahashi et al. |
| 4,996,340 A | 2/1991 | Miller |
| 5,017,446 A | 5/1991 | Reichman et al. |
| 5,044,067 A | 9/1991 | Wheadon et al. |
| 5,045,170 A | 9/1991 | Bullock et al. |
| 5,079,111 A | 1/1992 | Wheadon et al. |
| 5,096,611 A | 3/1992 | Matthew et al. |
| 5,149,606 A | 9/1992 | Bullock et al. |
| 5,252,105 A | 10/1993 | Witherspoon et al. |
| 5,273,554 A | 12/1993 | Vyas |
| 5,276,960 A | 1/1994 | Wheadon et al. |
| 5,290,359 A | 3/1994 | Coonen et al. |
| 5,302,476 A | 4/1994 | Kao et al. |
| 5,314,766 A | 5/1994 | Witherspoon et al. |
| 5,384,217 A | 1/1995 | Binder et al. |
| 5,434,025 A | 7/1995 | Rao et al. |
| 5,460,730 A | 10/1995 | Czerny et al. |
| 5,540,127 A | 7/1996 | Binder et al. |
| 5,601,945 A | 2/1997 | Clough |
| 5,652,074 A | 7/1997 | Larson, III et al. |
| 5,660,600 A | 8/1997 | Vyas |
| 5,690,718 A | 11/1997 | Sabin |
| 5,691,087 A | 11/1997 | Rao et al. |
| 5,759,716 A | 6/1998 | Clough |
| 5,874,186 A | 2/1999 | Rao et al. |
| 5,895,732 A | 4/1999 | Clough |
| 5,945,236 A | 8/1999 | Willis |
| 5,948,566 A | 9/1999 | Larsen et al. |
| 5,948,567 A | 9/1999 | Heller |
| RE36,734 E | 6/2000 | Binder et al. |
| 6,117,196 A | 9/2000 | Snyder et al. |
| 6,180,286 B1 | 1/2001 | Rao et al. |
| 6,228,527 B1 | 5/2001 | Medeiros et al. |
| 6,395,431 B1 | 5/2002 | Gao et al. |
| 6,454,977 B1 | 9/2002 | Kwok et al. |
| 6,528,211 B1 | 3/2003 | Nishimura et al. |
| 6,531,248 B1 | 3/2003 | Zguris et al. |
| 6,555,026 B1 | 4/2003 | Barker et al. |
| 6,617,071 B1 | 9/2003 | Chen et al. |
| 6,623,892 B1 | 9/2003 | Yamaguchi et al. |
| 6,632,573 B1 | 10/2003 | Nimon et al. |
| 6,635,192 B1 | 10/2003 | Schwarz |
| 6,635,387 B1 | 10/2003 | Fitter et al. |
| 6,733,547 B1 | 5/2004 | Ma |
| 6,749,950 B1 | 6/2004 | Zhang |
| 6,755,874 B1 | 6/2004 | Chen et al. |
| 2002/0124388 A1 | 9/2002 | Chen et al. |
| 2003/0044683 A1 | 3/2003 | Zguris et al. |
| 2003/0106205 A1 | 6/2003 | Ma |
| 2003/0157405 A1 | 8/2003 | Chen et al. |
| 2003/0165742 A1 | 9/2003 | Mann |
| 2003/0175203 A1 | 9/2003 | Nitsche et al. |
| 2004/0121233 A1 | 6/2004 | Klein et al. |
| 2004/0234852 A1 | 11/2004 | Klein et al. |
| 2005/0048372 A1 | 3/2005 | Chen et al. |
| 2005/0207969 A1 | 9/2005 | Flores-Lira et al. |

*Primary Examiner*—Jonathan Crepeau
(74) *Attorney, Agent, or Firm*—Patula & Associates, P.C.

(57) ABSTRACT

A battery paste additive, and process for making the same comprising micronized seed crystals of tetra basic lead sulfate, is added to battery paste and results in accelerated curing time and other improvements in battery performance. The battery paste additive may be used to produce positive or negative battery plates and may be use with conventional mixing, pasting and curing processes and equipment.

35 Claims, 17 Drawing Sheets

FIG. 1

| TYPE OF LEAD-ACID BATTERY PLATE PASTE MIX | LEAD OXIDE | MICRONIZED TTBLS ADDITIVE | WATER | SULFURIC ACID | FLOCK | EXPANDER |
|---|---|---|---|---|---|---|
| AUTOMOTIVE POSITIVE PLATE PASTE | 1071 KG (79.52% WEIGHT) | 10.71 KG (0.79% WEIGHT) | 140 KG (10.39% WEIGHT) | 125 KG (9.28% WEIGHT) | 0.5 KG (0.02% WEIGHT) | 0 0 |
| AUTOMOTIVE BATTERY NEGATIVE PASTE | 1071 KG (78.30% WEIGHT) | 10.71 KG (0.79% WEIGHT) | 140 KG (10.23% WEIGHT) | 135 KG (9.86% WEIGHT) | 0.5 KG (0.03% WEIGHT) | 10.71 KG (0.79% WEIGHT) |
| INDUSTRIAL POSITIVE PLATE PASTE | 1071 KG (80.09% WEIGHT) | 10.71 KG (0.80% WEIGHT) | 135 KG (79.52% WEIGHT) | 120 KG (8.98% WEIGHT) | 0.5 KG (0.04% WEIGHT) | 0 0 |
| INDUSTRIAL BATTERY NEGATIVE PASTE | 1071 KG (79.41% WEIGHT) | 10.71 KG (0.79% WEIGHT) | 130 KG (9.64% WEIGHT) | 115 KG (8.53% WEIGHT) | 0.5 KG (0.04% WEIGHT) | 21.4 KG (1.59% WEIGHT) |

FIG. 2A  EFFECT OF 1% TTBLS ON INDUSTRIAL PASTE AND PLATE CURING – 1ST SAMPLE

| CONTROL SAMPLES | | | | | |
|---|---|---|---|---|---|
| SAMPLE | TRIAL | A-PBO (TETRA) | B-PBO (ORTHO) | TETRABASIC | TRIBASIC |
| PASTE AT END OF MIXING | 1 | 58.0 | 2.6 | 0.0 | 39.4 |
| | 2 | 51.1 | 7.9 | 0.0 | 40.9 |
| | 3 | 59.4 | 2.2 | 1.2 | 37.2 |
| | 4 | 66.4 | 2.1 | 0.0 | 31.5 |
| | 5 | 50.2 | 1.1 | 2.4 | 46.3 |
| | AVG | 57.0 | 3.2 | 0.7 | 39.1 |
| PASTE PLATE AT END OF TUNNEL DRYER | 1 | 66.7 | 1.9 | 0.0 | 31.4 |
| | 2 | 59.2 | 8.5 | 5.7 | 26.6 |
| | 3 | 55.9 | 5.5 | 10.6 | 28.1 |
| | 4 | 61.8 | 4.8 | 2.1 | 31.3 |
| | 5 | 60.8 | 3.2 | 6.9 | 29.1 |
| | AVG | 60.9 | 4.8 | 5.1 | 29.3 |
| PLATES AFTER 3 HOURS CURING | 1 | 57.5 | 9.7 | 0.5 | 32.3 |
| | 2 | 61.2 | 10.7 | 0.0 | 28.8 |
| | 3 | 60.7 | 8.7 | 2.1 | 28.5 |
| | 4 | 60.4 | 9.8 | 1.0 | 28.7 |
| | 5 | 58.7 | 5.3 | 2.9 | 33.1 |
| | AVG | 59.7 | 8.8 | 1.3 | 30.3 |
| PLATES AFTER 6 HOURS CURING | 1 | 52.0 | 4.4 | 1.8 | 41.8 |
| | 2 | 57.1 | 9.1 | 0.0 | 33.7 |
| | 3 | 59.6 | 2.4 | 0.9 | 37.1 |
| | 4 | 54.4 | 8.2 | 1.6 | 35.8 |
| | 5 | 57.2 | 7.5 | 2.7 | 32.6 |
| | AVG | 56.1 | 6.3 | 1.4 | 36.2 |
| PLATES AFTER 9 HOURS CURING | 1 | 52.6 | 4.3 | 1.5 | 41.6 |
| | 2 | 67.7 | 2.3 | 1.9 | 28.2 |
| | 3 | 63.6 | 6.9 | 1.9 | 27.6 |
| | 4 | 60.2 | 10.4 | 2.3 | 27.2 |
| | 5 | 61.6 | 3.2 | 1.9 | 33.3 |
| | AVG | 61.1 | 5.4 | 1.9 | 31.6 |
| PLATES AFTER 12/13 HOURS CURING | 1 | 30.2 | 1.7 | 68.1 | 0.0 |
| | 2 | 59.1 | 10.3 | 4.6 | 26.0 |
| | 3 | 59.8 | 2.1 | 14.2 | 23.9 |
| | 4 | 64.9 | 2.3 | 11.0 | 21.8 |
| | 5 | 53.9 | 4.3 | 9.3 | 32.4 |
| | AVG | 53.6 | 4.8 | 21.4 | 26.0 |

FIG. 2B  EFFECT OF 1% TTBLS ON INDUSTRIAL PASTE AND PLATE CURING – 1ST SAMPLE

| EXPERIMENTAL SAMPLES | | | | | |
|---|---|---|---|---|---|
| SAMPLE | TRIAL | A-PBO (TETRA) | B-PBO (ORTHO) | TETRABASIC | TRIBASIC |
| PASTE AT END OF MIXING | 1 | 38.5 | 0.0 | 51.7 | 9.8 |
| | 2 | 34.1 | 0.7 | 57.7 | 7.5 |
| | 3 | 36.1 | 0.0 | 58.3 | 5.5 |
| | 4 | 40.2 | 0.0 | 55.1 | 4.7 |
| | 5 | 34.5 | 1.2 | 59.5 | 4.8 |
| | AVG | 36.7 | 0.4 | 56.5 | 6.5 |
| PASTE PLATE AT END OF TUNNEL DRYER | 1 | 81.9 | 8.1 | 10.1 | 0.0 |
| | 2 | 45.2 | 2.1 | 27.4 | 25.3 |
| | 3 | 44.1 | 1.6 | 29.9 | 23.9 |
| | 4 | 43.8 | 1.2 | 43.0 | 11.9 |
| | 5 | 48.6 | 3.4 | 19.5 | 28.5 |
| | AVG | 52.7 | 3.3 | 26.0 | 17.9 |
| PLATES AFTER 3 HOURS CURING | 1 | 26.2 | 2.2 | 71.6 | 0.0 |
| | 2 | 20.8 | 4.3 | 71.5 | 3.4 |
| | 3 | 34.6 | 3.4 | 57.4 | 4.6 |
| | 4 | 24.1 | 3.4 | 66.7 | 5.8 |
| | 5 | 36.9 | 1.9 | 51.3 | 10.0 |
| | AVG | 28.5 | 3.0 | 63.7 | 4.8 |
| PLATES AFTER 6 HOURS CURING | 1 | 25.3 | 2.9 | 71.8 | 0.0 |
| | 2 | 19.4 | 5.5 | 72.6 | 2.5 |
| | 3 | 31.0 | 2.0 | 67.0 | 0.0 |
| | 4 | 28.1 | 1.4 | 66.8 | 3.6 |
| | 5 | 32.6 | 1.7 | 65.6 | 0.0 |
| | AVG | 27.3 | 2.7 | 68.8 | 1.2 |
| PLATES AFTER 9 HOURS CURING | 1 | 26.7 | 4.5 | 61.7 | 7.0 |
| | 2 | 27.3 | 1.5 | 67.9 | 3.4 |
| | 3 | 31.0 | 1.8 | 67.2 | 0.0 |
| | 4 | 30.2 | 0.8 | 69.0 | 0.0 |
| | 5 | 29.0 | 1.6 | 65.8 | 3.5 |
| | AVG | 28.8 | 2.0 | 66.3 | 2.8 |
| PLATES AFTER 12/13 HOURS CURING | 1 | 29.5 | 1.0 | 69.5 | 0.0 |
| | 2 | 18.9 | 2.5 | 75.3 | 3.3 |
| | 3 | 32.5 | 1.5 | 65.9 | 0.0 |
| | 4 | 28.8 | 0.7 | 67.1 | 3.3 |
| | 5 | 30.9 | 1.0 | 68.1 | 0.0 |
| | AVG | 28.1 | 1.3 | 69.2 | 1.3 |

FIG. 3A  EFFECT OF 1% TTBLS ON INDUSTRIAL PASTE AND PLATE CURING – 2ND SAMPLE

| CONTROL SAMPLE | | | | | | |
|---|---|---|---|---|---|---|
| SAMPLE | SAMPLE NO. | PB | A-PBO (TETRA) | B-PBO (ORTHO) | TETRABASIC | TRIBASIC |
| PASTE AT END OF MIXING |  | 13.8 | 25.8 | 5.1 | 5.1 | 50.3 |
|  | AVG | 13.8 | 25.8 | 5.1 | 5.1 | 50.3 |
| PASTED PLATE AT END OF TUNNEL |  | 15.6 | 28.2 | 2.4 | 10.6 | 43.3 |
|  | AVG | 15.6 | 28.2 | 2.4 | 10.6 | 43.3 |
| FULL RACK IN CHAMBER |  | 16.5 | 28.5 | 13.8 | 0.0 | 41.2 |
|  | AVG | 16.5 | 28.5 | 13.8 | 0.0 | 41.2 |
| AFTER 2 HOURS IN CHAMBER |  | 17.1 | 27.7 | 8.0 | 2.8 | 44.4 |
|  | AVG | 17.1 | 27.7 | 8.0 | 2.8 | 44.4 |
| AFTER 4 HOURS IN CHAMBER |  | 14.6 | 22.6 | 3.1 | 16.2 | 43.5 |
|  | AVG | 14.6 | 22.6 | 3.1 | 16.2 | 43.5 |
| AFTER 6.5 HOURS IN CHAMBER |  | 17.2 | 24.8 | 2.4 | 14.9 | 40.7 |
|  | AVG | 17.2 | 24.8 | 2.4 | 14.9 | 40.7 |
| AFTER 8.6 HOURS IN CHAMBER |  | 18.6 | 19.8 | 16.1 | 3.3 | 42.2 |
|  | AVG | 18.6 | 19.8 | 16.1 | 3.3 | 42.2 |
| AFTER 12.5 HOURS IN CHAMBER |  | 12.0 | 17.5 | 4 | 29 | 37.4 |
|  | AVG | 12.0 | 17.5 | 4 | 29 | 37.4 |
| AFTER 16.5 HOURS IN CHAMBER |  | 3.2 | 14.5 | 1.1 | 59.6 | 21.6 |
|  | AVG | 3.2 | 14.5 | 1.1 | 59.6 | 21.6 |
| AFTER 20.5 HOURS IN CHAMBER |  | 4.7 | 25 | 14.85 | 43.5 | 25.1 |
|  |  | 0 | 15 | 1.1 | 75.3 | 8.6 |
|  | AVG | 2.35 | 20 | 7.975 | 59.4 | 16.85 |
| AFTER 24.5 HOURS IN CHAMBER |  | 0 | 15 | 1.1 | 75.3 | 8.6 |
|  | AVG | 0 | 15 | 1.1 | 75.3 | 8.6 |
| AFTER 28.5 HOURS IN CHAMBER |  | 0 | 15.4 | 1.3 | 76.8 | 6.6 |
|  | AVG | 0 | 15.4 | 1.3 | 76.8 | 6.6 |

FIG. 3B     EFFECT OF 1% TTBLS ON INDUSTRIAL PASTE AND PLATE CURING – 2ND SAMPLE

| \multicolumn{7}{EXPERIMENTAL SAMPLES} |
|---|---|---|---|---|---|---|
| SAMPLE | SAMPLE NO. | PB | A-PBO (TETRA) | B-PBO (ORTHO) | TETRABASIC | TRIBASIC |
| PASTE AT END OF MIXING | | 11.4 | 10.9 | 2.7 | 53.2 | 21.9 |
| | | 17.8 | 6.7 | 0.8 | 69.1 | 5.6 |
| | | 18.7 | 6.3 | 0.0 | 50.0 | 25.0 |
| | AVG | 15.97 | 8.0 | 1.2 | 57.4 | 17.5 |
| PASTED PLATE AT END OF TUNNEL | | 8.2 | 13.0 | 3.2 | 54.7 | 20.9 |
| | | 16.6 | 8.6 | 0.9 | 57.3 | 16.6 |
| | | 19.8 | 4.7 | 0.0 | 67.4 | 8.1 |
| | AVG | 14.87 | 8.8 | 1.4 | 59.8 | 15.2 |
| FULL RACK IN CHAMBER | | 8.2 | 13.5 | 0.9 | 62.3 | 15.2 |
| | | 18.4 | 6.0 | 0.4 | 56.1 | 19.1 |
| | | 18.3 | 9.2 | 0.8 | 66.2 | 5.5 |
| | AVG | 14.97 | 9.6 | 0.7 | 61.5 | 13.3 |
| AFTER 2 HOURS IN CHAMBER | | 9 | 12.8 | 1.1 | 77.1 | 0.0 |
| | | 12.6 | 5.7 | 2.7 | 70.6 | 8.5 |
| | | 19.2 | 5.8 | 1.3 | 64.7 | 9.0 |
| | AVG | 13.60 | 8.1 | 1.7 | 70.8 | 5.8 |
| AFTER 4 HOURS IN CHAMBER | | 7.3 | 6.9 | 1.0 | 73.0 | 11.8 |
| | | 12.2 | 4.4 | 1.4 | 68.2 | 13.9 |
| | | 6.5 | 9.6 | 1.0 | 75.5 | 7.4 |
| | AVG | 8.67 | 7.0 | 1.1 | 72.2 | 11.0 |
| AFTER 6 HOURS IN CHAMBER | | 7.8 | 10.5 | 1.1 | 80.2 | 0.3 |
| | | 11.9 | 2.7 | 1.4 | 70.0 | 14.0 |
| | | 7.3 | 3.9 | 2.0 | 74.1 | 12.7 |
| | AVG | 9 | 5.7 | 1.5 | 74.8 | 9.0 |
| AFTER 8 HOURS IN CHAMBER | | 6.4 | 5.2 | 1.6 | 73 | 13.8 |
| | | 9.4 | 7.9 | 1.6 | 72.4 | 8.7 |
| | AVG | 7.9 | 6.55 | 1.6 | 72.7 | 11.25 |
| AFTER 10 HOURS IN CHAMBER | | 2.4 | 5.9 | 2.2 | 80 | 9.5 |
| | AVG | 2.4 | 5.9 | 2.2 | 80 | 9.5 |
| AFTER 12 HOURS IN CHAMBER | | 1.9 | 3.4 | 2.4 | 83.7 | 8.5 |
| | | 1.7 | 10.5 | 1.7 | 80.3 | 5.8 |
| | AVG | 1.8 | 6.95 | 2.05 | 82 | 7.15 |
| AFTER 14 HOURS IN CHAMBER | | 7.4 | 8.4 | 1.2 | 72.4 | 10.6 |
| | AVG | 7.4 | 8.4 | 1.2 | 72.4 | 10.6 |
| AFTER 16 HOURS IN CHAMBER | | 1.2 | 5.6 | 2 | 83.4 | 7.7 |
| | | 13.1 | 8.4 | 1.3 | 72.4 | 4.8 |
| | AVG | 7.15 | 7.00 | 1.65 | 77.90 | 6.25 |
| AFTER 18 HOURS IN CHAMBER | | 1.3 | 4.4 | 3.3 | 83.7 | 7.3 |
| | | 0 | 7.2 | 0 | 86.5 | 6.4 |
| | AVG | 0.65 | 5.8 | 1.65 | 85.1 | 6.85 |
| AFTER 20 HOURS IN CHAMBER | | 1.7 | 6.9 | 2.3 | 81.1 | 7.9 |
| | | 0.8 | 10.8 | 1.9 | 86.5 | 0 |
| | AVG | 1.05 | 7.83 | 1.95 | 84.23 | 4.92 |
| AFTER 22 HOURS IN CHAMBER | | 1.3 | 4.4 | 3.3 | 83.7 | 7.3 |
| | AVG | 1.3 | 4.4 | 3.3 | 83.7 | 7.3 |
| AFTER 24 HOURS IN CHAMBER | | 1.5 | 11.8 | 2.3 | 84.5 | 0 |
| | | 1.3 | 8.7 | 2.4 | 80.3 | 7.3 |
| | AVG | 1.4 | 10.25 | 2.35 | 82.4 | 3.65 |
| AFTER 26 HOURS IN CHAMBER | | 0.7 | 6.4 | 2.1 | 89.7 | 1.1 |
| | AVG | 0.7 | 6.4 | 2.1 | 89.7 | 1.1 |
| AFTER 28 HOURS IN CHAMBER | | 0.6 | 11.5 | 1.9 | 86 | 0 |
| | | 1.1 | 6 | 2.4 | 89.2 | 1.4 |
| | AVG | 0.85 | 8.75 | 2.15 | 87.6 | 0.7 |

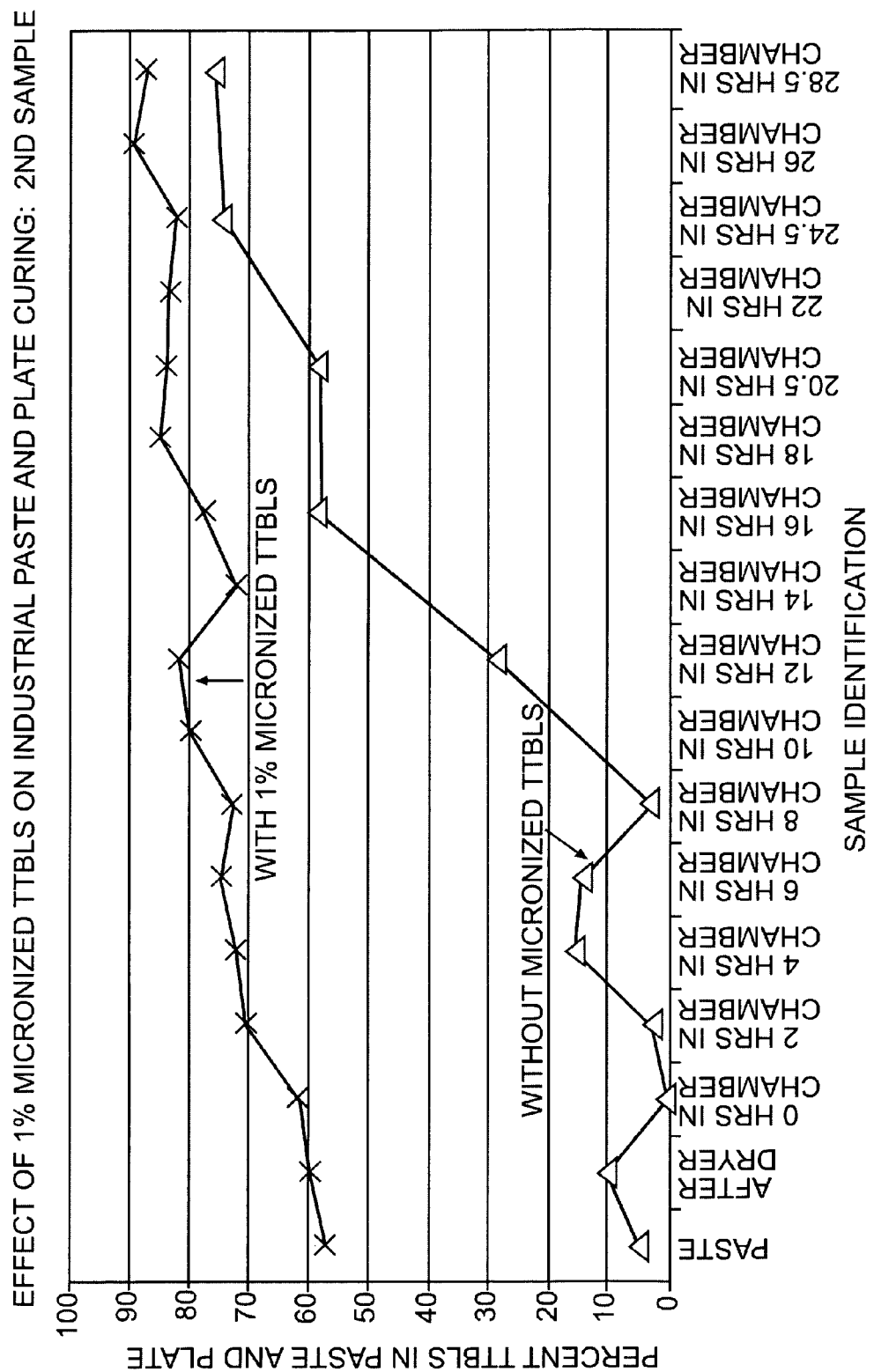

FIG. 6A EFFECT OF 1% TTBLS ON AUTOMOTIVE PASTE AND PLATE CURING – THIRD SAMPLE

| CONTROL SAMPLE | | | | | | |
|---|---|---|---|---|---|---|
| SAMPLE | TRIAL | PB | A-PBO (TETRA) | B-PBO (ORTHO) | TETRABASIC | TRIBASIC |
| PASTE AT END OF MIXING | 41 | 9.3 | 62.3 | 0.0 | 0.0 | 26.6 |
| | 40 | 3.1 | 72.5 | 1.4 | 0.0 | 23.1 |
| | AVG | 6.2 | 67.4 | 0.7 | 0.0 | 24.9 |
| PASTED PLATE AT END OF TUNNEL DRYER | 37 | 5.4 | 60.4 | 0.0 | 0.0 | 34.2 |
| | 38 | 18.7 | 49.3 | 0.7 | 0.0 | 31.3 |
| | 39 | 10.8 | 58.3 | 0.5 | 0.0 | 30.4 |
| | AVG | 11.63 | 56.0 | 0.4 | 0.0 | 32.0 |
| TWO HOURS AFTER LOADING CURING CHAMBER | AVG | | | | | |
| SIX HOURS AFTER LOADING CURING CHAMBER | 1 | | 52.0 | 4.4 | 1.8 | 41.8 |
| | 2 | | 57.1 | 9.1 | 0.0 | 33.7 |
| | 3 | | 59.6 | 2.4 | 0.9 | 37.1 |
| | 4 | | 54.4 | 8.2 | 1.6 | 35.8 |
| | 5 | | 57.2 | 7.5 | 2.7 | 32.6 |
| | AVG | | 56.1 | 6.3 | 1.4 | 36.2 |
| 8 HOURS AFTER LOADING CURING CHAMBER | 12 | 7 | 63.1 | 1.0 | 0.0 | 28.8 |
| | 17 | 8.3 | 60.5 | 5.5 | 0.0 | 26.1 |
| | 18 | 6.8 | 59.1 | 5.1 | 0.0 | 28.9 |
| | 4 | | 60.2 | 10.4 | 2.3 | 27.2 |
| | 5 | | 61.6 | 3.2 | 1.9 | 33.3 |
| | AVG | 7.4 | 60.9 | 5.0 | 0.8 | 28.9 |
| 18 HOURS AFTER LOADING CURING CHAMBER | 21 | 8.1 | 57.9 | 2.8 | 7.3 | 24.0 |
| | 23 | 7.5 | 58.2 | 3.6 | 7.9 | 24.0 |
| | 24 | 7.7 | 67.7 | 0.0 | 0.0 | 24.6 |
| | AVG | 7.8 | 63.0 | 1.8 | 4.0 | 24.3 |
| 24 HOURS AFTER LOADING CURING CHAMBER | 29 | 5.1 | 44.4 | 0 | 35.7 | 14.8 |
| | 30 | 2.5 | 62.6 | 1 | 12.1 | 21.8 |
| | AVG | 3.8 | 53.5 | 0.5 | 23.9 | 18.3 |
| END OF CURE | 31 | 0 | 53.2 | 0.3 | 31.96 | 14.7 |
| | 32 | 0.8 | 50.7 | 0 | 36.2 | 12.3 |
| | AVG | 0.4 | 51.95 | 0.15 | 34.05 | 13.5 |

FIG. 6B EFFECT OF 1% TTBLS ON AUTOMOTIVE PASTE AND PLATE CURING – THIRD SAMPLE

| SAMPLE | TRIAL | PB | A-PBO (TETRA) | B-PBO (ORTHO) | TETRABASIC | TRIBASIC |
|---|---|---|---|---|---|---|
| PASTE AT END OF MIXING | 1 | 6.7 | 51.0 | 0.0 | 19.8 | 23.1 |
| | 2 | 14.9 | 48.3 | 0.9 | 12.2 | 23.7 |
| | AVG | 10.8 | 49.7 | 0.5 | 16.0 | 23.4 |
| PASTED PLATE AT END OF TUNNEL DRYER | 3 | 10.3 | 49.3 | 0.5 | 14.3 | 25.8 |
| | 4 | 8 | 47.7 | 4.1 | 15.9 | 24.3 |
| | 5 | 17.2 | 43.0 | 0.6 | 14.3 | 24.9 |
| | 42 | 13.8 | | 1.2 | 21.4 | 22.1 |
| | AVG | 12.3 | 46.7 | 1.6 | 16.5 | 24.3 |
| TWO HOURS AFTER LOADING CURING CHAMBER | 6 | 12.9 | 43.3 | 0.6 | 21.8 | 21.3 |
| | 7 | 14.4 | 44.3 | 4.8 | 17.8 | 19.1 |
| | 8 | 12.3 | 49.2 | 1.4 | 18.4 | 18.8 |
| | 9 | 10.2 | 45.3 | 0.4 | 24.1 | 20.1 |
| | AVG | 12.4 | 45.5 | 1.8 | 20.5 | 19.8 |
| SIX HOURS AFTER LOADING CURING CHAMBER | 10 | 4.4 | 25.2 | 4.4 | 60.7 | 5.3 |
| | AVG | 4.4 | 25.2 | 4.4 | 60.7 | 5.3 |
| 8 HOURS AFTER LOADING CURING CHAMBER | 11 | 6.5 | 21.6 | 1.0 | 66.3 | 4.5 |
| | 13 | 1.9 | 26.8 | 1.8 | 64.3 | 5.2 |
| | 14 | 4 | 29.0 | 2.5 | 56.9 | 7.6 |
| | 15 | 0 | 29.6 | 1.9 | 62.6 | 5.8 |
| | 16 | 3.9 | 24.8 | 1.9 | 63.7 | 5.7 |
| | AVG | 4.1 | 26.4 | 1.8 | 62.8 | 5.8 |
| 18 HOURS AFTER LOADING CURING CHAMBER | 19 | 5.6 | 21.9 | 2.8 | 66.1 | 3.7 |
| | 20 | 5.3 | 22.3 | 3.4 | 64.3 | 4.3 |
| | 22 | 6.1 | 24.8 | 0.9 | 64.7 | 3.4 |
| | | 3.7 | 25.1 | 2.3 | 68.9 | 0.0 |
| | AVG | 5.7 | 23.53 | 2.35 | 66.0 | 2.9 |
| 24 HOURS AFTER LOADING CURING CHAMBER | 25 | 1.3 | 24.5 | 0.8 | 69.9 | 3.5 |
| | 26 | 1.5 | 25.5 | 0 | 69.3 | 3.6 |
| | 27 | 2.6 | 28 | 1.1 | 61.8 | 6.5 |
| | 28 | 2.9 | 25.8 | 0 | 67.4 | 3.8 |
| | AVG | 2.075 | 25.95 | 0.475 | 67.1 | 4.35 |
| END OF CURE | 33 | 0 | 27.3 | 2.5 | 67.2 | 3 |
| | 34 | 3 | 28.4 | 1.3 | 64 | 3.2 |
| | 35 | 0.6 | 27.6 | 0 | 68.6 | 3.2 |
| | 36 | 0.6 | 26 | 3.1 | 64 | 6.2 |
| | AVG | 1.05 | 27.325 | 1.725 | 65.95 | 3.9 |

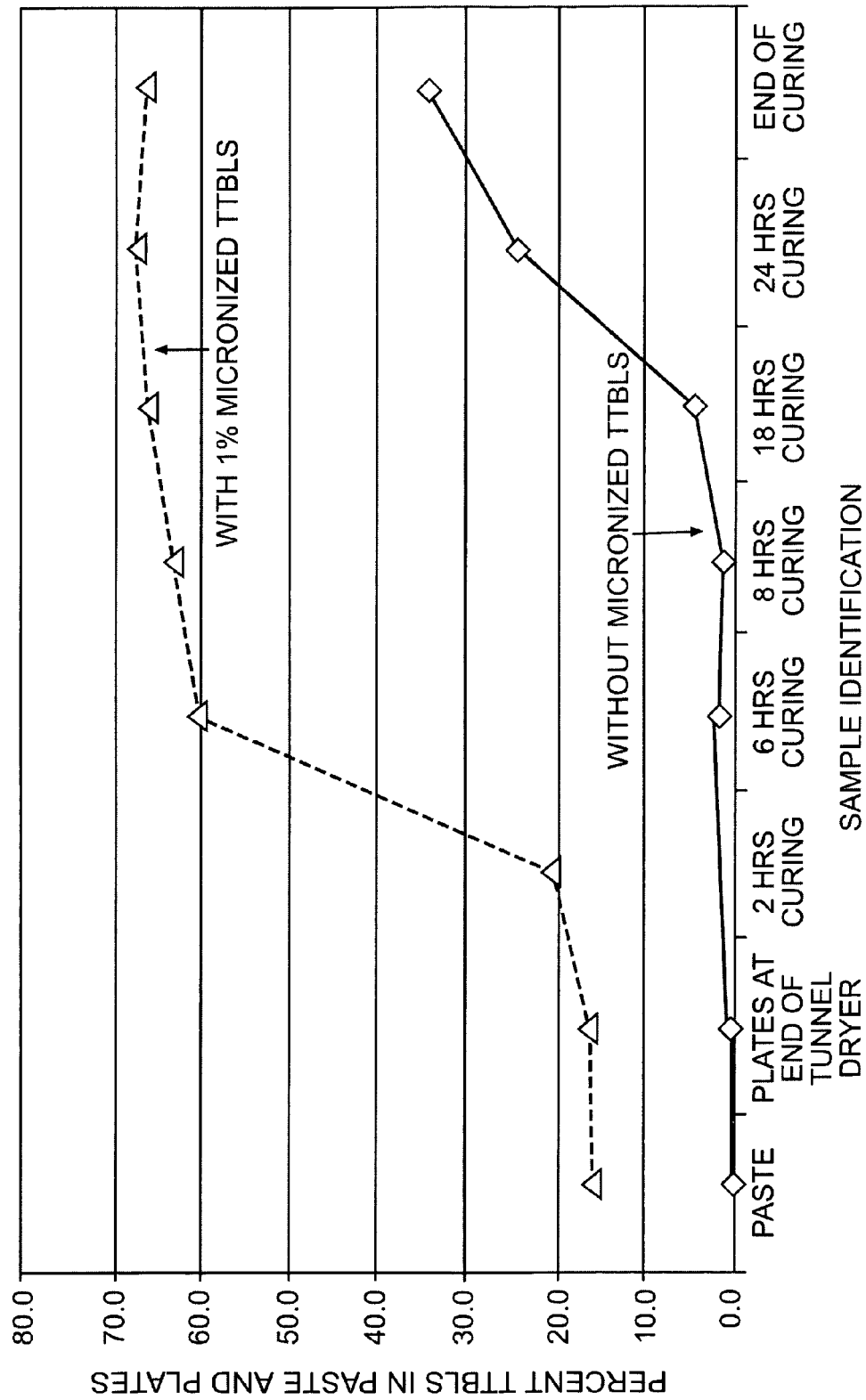

FIG. 8

| CONTROL SAMPLES (NO MICRONIZED TTBLS) | TIME (HRS) | PB | A-PBO (TETRA) | B-PBO (ORTHO) | TTBLS | TRBLS |
|---|---|---|---|---|---|---|
| CONTROL END OF TUNNEL | 0 | 7.7 | 51.5 | 0 | 0 | 41.2 |
| CONTROL END OF TUNNEL | 0 | 6.5 | 43.4 | 9.2 | 0 | 35.2 |
| CONTROL END OF TUNNEL | 0 | 6 | 42.2 | 5.5 | 0 | 43.4 |
| AVG | 0 | 6.73 | 45.57 | 4.9 | 0 | 40.93 |
| CONTROL RACK IN CURING CHAMBER | 0.08 | 0.6 | 46 | 8 | 2.1 | 43.3 |
| CONTROL RACK IN CURING CHAMBER | 0.08 | 5.1 | 43.2 | 8.5 | 0 | 43.3 |
| CONTROL RACK IN CURING CHAMBER | 0.08 | 6.1 | 43.8 | 7.6 | 0 | 42.4 |
| AVG | 0.08 | 3.93 | 44.33 | 8.03 | 0.7 | 43.00 |
| CONTROL | 1.83 | 3.5 | 41.4 | 13.2 | 2.1 | 39.8 |
| CONTROL | 1.83 | 4.3 | 42.9 | 12.6 | 0.8 | 39.3 |
| AVG | 1.83 | 4.46 | 43.11 | 10.36 | 1.45 | 39.55 |
| CONTROL | 2.25 | 4.3 | 42.4 | 12.2 | 1 | 40.1 |
| CONTROL | 2.25 | 3.4 | 45.4 | 12.4 | 0 | 38.7 |
| AVG | 2.25 | 3.85 | 43.9 | 12.3 | 0.5 | 39.4 |
| CONTROL | 3 | 5.2 | 46.9 | 3.2 | 1.4 | 43.2 |
| CONTROL | 4 | 4.1 | 45.9 | 5.5 | 6.6 | 38 |
| CONTROL | 4 | 4 | 47.8 | 1.6 | 0 | 47.3 |
| AVG | 4 | 4.05 | 45.5 | 3.55 | 3.3 | 42.65 |
| CONTROL | 5 | 8.3 | 44 | 4.2 | 3.4 | 40.1 |
| CONTROL | 5 | 2.9 | 52.5 | 2.9 | 0 | 41.7 |
| AVG | 5 | 5.6 | 48.25 | 3.55 | 1.7 | 40.9 |
| CONTROL | 6 | 5.8 | 43 | 10.9 | 2.1 | 38.2 |
| CONTROL | 6 | 5.2 | 41.8 | 11.3 | 3.7 | 38 |
| AVG | 6 | 5.5 | 42.4 | 11.1 | 2.9 | 38.1 |
| CONTROL | 7 | 1.8 | 51.1 | 10.2 | 0 | 36.8 |
| CONTROL | 10.75 | 4.3 | 47.7 | 5 | 1.9 | 41 |
| CONTROL | 14.75 | 8.2 | 43.5 | 2.9 | 5.4 | 40.1 |
| CONTROL | 16.75 | 2.1 | 52.2 | 5.5 | 3.8 | 36.2 |
| CONTROL | 22.75 | 3 | 52.5 | 7.4 | 3.3 | 33.8 |
| CONTROL | 26.75 | 0 | 53.8 | 1.2 | 3.9 | 41.2 |
| CONTROL | 26.75 | 3.4 | 54.5 | 1.9 | 0 | 40.2 |
| AVG | 26.75 | 1.7 | 54.15 | 1.55 | 1.95 | 40.7 |
| CONTROL | 27.5 | 0 | 42.4 | 9.3 | 8 | 40.3 |
| CONTROL | 27.5 | 1.4 | 41.3 | 5.7 | 4.9 | 46.7 |
| AVG | 27.5 | 0.7 | 41.85 | 7.5 | 6.45 | 43.5 |
| CONTROL | 34 | 0 | 50.5 | 0 | 11.1 | 38.4 |
| CONTROL | 40.5 | 3.5 | 51.3 | 1.7 | 4.3 | 36.3 |
| CONTROL | 46.5 | 1.9 | 46.4 | 3.6 | 7.5 | 40.6 |
| CONTROL | 46.5 | 3.1 | 34.1 | 9.2 | 11.8 | 42.3 |

FIG. 9

| EXPERIMENTAL SAMPLES, TRIAL 1 (1% MICRONIZED TTBLS) | TIME (HRS) | PB | A-PBO (TETRA) | B-PBO (ORTHO) | TTBLS | TRBLS |
|---|---|---|---|---|---|---|
| EXP. 1 PASTE MIX | 0 | 0.9 | 35.1 | 1.2 | 46.9 | 15.8 |
| EXP. 1 PASTE MIX | 0 | 0 | 23.8 | 2.2 | 37.2 | 36.4 |
| AVG | 0 | 0.45 | 29.45 | 1.7 | 42.05 | 26.1 |
| EXP. 1 PASTE MIX 2 | 0 | 2.1 | 0 | 4.4 | 61 | 32.5 |
| EXP. 1 PASTE MIX 2 | 0 | 0 | 0 | 5 | 61.9 | 33.2 |
| AVG | 0 | 1.05 | 0 | 4.7 | 61.45 | 32.85 |
| EXP. 1 END OF TUNNEL DRYER | 0.33 | 0 | 31.7 | 5.3 | 34.7 | 28.2 |
| EXP. 1 | 1.25 | 0.4 | 35.8 | 3.7 | 37 | 23.1 |
| EXP. 1 | 3 | 2.1 | 21.8 | 2.3 | 60.4 | 13.5 |
| EXP. 1 | 3 | 0 | 21.6 | 2.6 | 64.2 | 11.7 |
| AVG | 3 | 1.05 | 21.7 | 2.45 | 62.3 | 12.6 |
| EXP. 1 | 4 | 0 | 16 | 3.4 | 70.3 | 10.3 |
| EXP. 1 | 4 | 1.8 | 19.1 | 2.7 | 68.1 | 8.3 |
| EXP. 1 | 4 | 0.7 | 19.9 | 2.1 | 69.4 | 7.9 |
| AVG | 4 | 0.83 | 18.33 | 2.73 | 69.27 | 8.83 |
| EXP. 1 | 6 | 0 | 12.9 | 1.1 | 80.1 | 5.9 |
| EXP. 1 | 6 | 0 | 8.2 | 7 | 72.8 | 12 |
| AVG | 6 | 0 | 10.55 | 4.05 | 76.45 | 8.95 |
| EXP. 1 | 9.75 | 0 | 5.9 | 10.3 | 77.7 | 6.1 |
| EXP. 1 | 9.75 | 5.2 | 12.4 | 2.1 | 79.7 | 0.6 |
| AVG | 9.75 | 2.6 | 9.15 | 6.2 | 78.7 | 3.35 |
| EXP. 1 | 13.75 | 0 | 16.3 | 2.3 | 77.1 | 4.3 |
| EXP. 1 | 17.75 | 0 | 16.8 | 1 | 78.5 | 2.8 |
| EXP. 1 | 17.75 | 2.4 | 6.8 | 8.6 | 77 | 5.3 |
| EXP. 1 | 17.75 | 0 | 15.7 | 2.3 | 77.7 | 4.3 |
| AVG | 17.75 | 0.8 | 13.1 | 3.67 | 77.78 | 4.13 |
| EXP. 1 | 21.75 | 1.3 | 4.6 | 9.1 | 78.5 | 6.4 |
| EXP. 1 | 25 | 0.8 | 7.4 | 5 | 79.9 | 6.8 |
| EXP. 1 | 29.75 | 0.5 | 7.5 | 0 | 87.3 | 4.7 |
| EXP. 1 | 29.75 | 0 | 20.6 | 2.1 | 77.3 | 0 |
| EXP. 1 | 29.75 | 0 | 13.8 | 2.8 | 81.8 | 0 |
| AVG | 29.75 | 0.17 | 13.97 | 1.63 | 82.13 | 1.57 |
| EXP. 1 | 35.75 | 0 | 19.5 | 2.5 | 78.5 | 0 |
| EXP. 1 | 35.75 | 0 | 17.4 | 2.9 | 79.6 | 0 |
| AVG | 35.75 | 0 | 18.45 | 2.7 | 79.05 | 0 |

FIG. 10

| EXPERIMENTAL SAMPLES, TRIAL 2 (1% MICRONIZED TTBLS) | TIME (HRS) | PB | A-PBO (TETRA) | B-PBO (ORTHO) | TTBLS | TRBLS |
|---|---|---|---|---|---|---|
| EXP. 2 PASTE MIX | 0 | 0 | 29.2 | 0.9 | 56.7 | 13.1 |
| EXP. 2 PASTE MIX | 0 | 1.1 | 28.7 | 1.3 | 53.4 | 15.5 |
| EXP. 2 PASTE MIX | 0 | 0 | 20.1 | 1.9 | 51.6 | 26.4 |
| AVG | 0 | 0.37 | 26.00 | 1.37 | 53.90 | 18.33 |
| EXP. 2 END OF TUNNEL DRYER | 0.2 | 1.5 | 33.7 | 1.6 | 40 | 23.2 |
| EXP. 2 RACK IN CURING CHAMBER | 0.33 | 1.6 | 32.6 | 3 | 41.9 | 20.9 |
| EXP. 2 | 1 | 1.9 | 28 | 1.5 | 51.5 | 17.2 |
| EXP. 2 | 2 | 0 | 26.8 | 2.3 | 60.5 | 10.4 |
| EXP. 2 | 2 | 0 | 26.6 | 0 | 62.2 | 11.2 |
| AVG | 2 | 0 | 26.7 | 1.15 | 61.35 | 10.6 |
| EXP. 2 | 4 | 0 | 15.3 | 3.7 | 78.7 | 2.4 |
| EXP. 2 | 4 | 2.9 | 19.7 | 2.5 | 65.8 | 9.1 |
| AVG | 4 | 1.45 | 17.5 | 3.1 | 72.25 | 5.75 |
| EXP. 2 | 5 | 1.7 | 15 | 2.9 | 80.4 | 0 |
| EXP. 2 | 5.5 | 1.7 | 14.6 | 3.3 | 75.8 | 4.4 |
| EXP. 2 | 6 | 0 | 14.6 | 3.1 | 82.3 | 0 |
| EXP. 2 | 6 | 0 | 15.4 | 2.9 | 78.4 | 6.4 |
| EXP. 2 | 6 | 1.2 | 17.9 | 2.9 | 70.6 | 7.4 |
| AVG | 6 | 0.4 | 15.97 | 2.93 | 76.10 | 4.60 |
| EXP. 2 | 9.25 | 0.8 | 13.9 | 3.4 | 77 | 4.9 |
| EXP. 2 | 12.25 | 0 | 15.1 | 3.6 | 81.3 | 0 |
| EXP. 2 | 21.75 | 0 | 10.7 | 2.4 | 81.1 | 5.2 |
| EXP. 2 | 21.75 | 0 | 6.2 | 1.6 | 87.2 | 5 |
| AVG | 21.75 | 0 | 8.45 | 2 | 84.15 | 5.1 |
| EXP. 2 | 26 | 0 | 4 | 5.8 | 84.4 | 5.6 |
| EXP. 2 | 26 | 0.8 | 16.9 | 2.9 | 79 | 0.5 |
| EXP. 2 | 26 | 0.5 | 16.5 | 3.3 | 79.7 | 7 |
| AVG | 26 | 0.43 | 12.47 | 4.00 | 81.03 | 4.43 |
| EXP. 2 | 29.25 | 0 | 18.7 | 1.9 | 79.5 | 0 |
| EXP. 2 | 30.25 | 0 | 16.8 | 2 | 81 | 0 |
| EXP. 2 | 35.75 | 0 | 18.2 | 2.9 | 78.9 | 0 |
| EXP. 2 | 35.75 | 0.5 | 18.3 | 2.2 | 79 | 0 |
| AVG | 35.75 | 0.25 | 18.25 | 2.55 | 78.95 | 0 |
| EXP. 2 | 48.17 | 0 | 16.5 | 3.1 | 80.4 | 0 |

FIG. 13 EFFECT OF 1% TTBLS ON INDUSTRIAL PASTE AND PLATE CURING

| PASTE MIX NO. | PB [WT.%] | A-PBO [WT.%] | B-PBO [WT.%] | TTBLS [WT.%] | TRBLS [WT.%] |
|---|---|---|---|---|---|
| MIX - 1 | 0.0 | 27.0 | 1.3 | 71.7 | 0.0 |
| MIX - 2 | 2.8 | 15.5 | 0.9 | 79.4 | 1.4 |
| MIX - 3 | 0.0 | 16.7 | 1.7 | 81.6 | 0.0 |
| MIX - 4 | 1.7 | 21.3 | 1.3 | 75.7 | 0.0 |
| MIX - 5 | 4.6 | 23.1 | 1.6 | 70.8 | 0.0 |
| MIX - 6 | 0.0 | 29.0 | 1.1 | 69.9 | 0.0 |
| MIX - 7 | 1.1 | 25.8 | 1.7 | 71.4 | 0.0 |
| MIX - 8 | 1.6 | 25.2 | 0.8 | 72.5 | 0.0 |
| MIX - 9 | 1.5 | 29.9 | 1.1 | 67.5 | 0.0 |
| MIX - 10 | 5.7 | 28.5 | 0.8 | 65.1 | 0.0 |
| MIX - 11 | 2.2 | 30.0 | 1.7 | 60.5 | 5.7 |
| MIX - 12 | 1.3 | 27.0 | 1.7 | 69.9 | 0.0 |
| MIX - 13 | 0.0 | 25.5 | 2.5 | 71.9 | 0.0 |
| MIX - 14 | 0.0 | 26.3 | 1.8 | 71.9 | 0.0 |

*FIG. 14*

|  | 1ST RESERVE CAPACITY (MINUTES) | 2ND RESERVE CAPACITY (MINUTES) | 3RD RESERVE CAPACITY (MINUTES) | 1ST COLD CRANKING AMPS (AMPERES) | 2ND COLD CRANKING AMPS (AMPERES) | 3RD COLD CRANKING AMPS (AMPERES) | AMPERE-HOURS AT 20 HOUR RATE |
|---|---|---|---|---|---|---|---|
| WITHOUT MICRONIZED TTBLS | 125.9 | 114.8 | 94.9 | 699 | 713 | 676 | 57.9 |
|  | 124.6 | 116.9 | 99.6 | 702 | 723 | 676 | 59.2 |
|  | 123.7 | 112.4 | 94.7 | 693 | 710 | 660 | 57 |
| AVG | 124.7 | 114.7 | 96.4 | 698 | 715 | 671 | 58.02 |
| WITH MICRONIZED TTBLS | 126.7 | 132 | 126.7 | 705 | 746 | 666 | 64.7 |
|  | 127.3 | 130.5 | 124.2 | 705 | 742 | 675 | 63.3 |
|  | 128.1 | 131.1 | 126.7 | 701 | 732 | 685 | 63.78 |
| AVG | 127.4 | 131.2 | 125.9 | 704 | 740 | 675 | 63.92 |

BATTERY PASTE ADDITIVE AND METHOD FOR PRODUCING BATTERY PLATES

The present invention relates generally to battery pastes and the curing process for battery plates. In particular, an improvement to battery paste and the curing process for battery plates for lead acid batteries is disclosed. More specifically, the present invention comprises a battery paste additive of micronized tetra basic lead sulfate crystals used to promote formation of additional tetra basic lead sulfate in the paste and plates. As a result, the curing process is accelerated and the resultant positive and negative battery plates have improved performance characteristics.

BACKGROUND OF THE INVENTION

Traditional methods for producing battery plates for lead-acid batteries generally involve a mixing, curing and drying operation in which the active materials in the battery paste undergo chemical and physical changes that are used to establish the chemical and physical structure and subsequent mechanical strength necessary to form the battery plate. To produce typical battery plates, materials are added to commercial paste mixing machines common in the industry in the order of lead oxide, flock, water and sulfuric acid, which are then mixed to a paste consistency. During mixing, chemical reactions take place in the paste producing basic lead sulfates, the most common of which is tribasic lead sulfate. The final paste composition is a mixture of basic lead sulfates, unreacted lead monoxide and residual free lead particles. Pasting is the process of making a battery plate from the paste mix. This paste is dispersed into a commercial automatic pasting machine of a type common in the industry which applies the paste to a grid structure composed of a lead alloy. The paste is dispensed into a hopper on the pasting machine and from there the paste is applied to the grids at high speed. The paste plates are generally surface dried in a tunnel dryer of a type common in the industry and then either stacked in columns or placed on racks. The stacked or racked plates are then placed in curing chambers. In these chambers the plates are subjected to temperatures of 70° C.–80° C. in a high humidity atmosphere to convert the tribasic lead sulfate in the plates to tetra basic lead sulfate and to allow oxidation of the residual free lead. The finished plates are now ready for assembly into batteries.

Two key factors important in the curing process are the formation of a proper crystal structure by converting tribasic lead sulfate (TRBLS) formed during paste mixing into tetra basic lead sulfate (TTBLS), and the formation of tetragonal lead oxide by oxidizing residual free lead metal. Generally, a crystal structure high in tetra basic lead sulfate will increase battery life. The general formula for converting tribasic lead sulfate to tetra basic lead sulfate is set forth below:

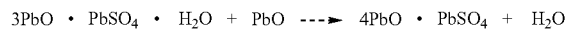

$$3PbO \cdot PbSO_4 \cdot H_2O + PbO \longrightarrow 4PbO \cdot PbSO_4 + H_2O$$

A common problem with traditional battery paste compositions and methods for curing is that the chemical characteristics of the resultant plates are not uniform, varying in quality. Other common problems include difficulty in the repeatability of production, uncertain and/or lengthy curing time, the large number of curing chambers needed to process plates, and high capital and energy costs.

Consequently, a need exists for improvements in battery pastes which may be used with conventional paste mixing and curing processes, procedures and equipment to produce positive and/or negative battery plates having greater uniformity, more consistent quality, more consistent reproducibility, requiring shorter and more consistent curing times, requiring less curing chambers to process the plates and less capital and energy costs than traditional positive and/or negative battery plate pastes and methods of paste mixing and curing.

The present invention overcomes the disadvantages and/or shortcomings of known prior art battery pastes and curing methods for battery plates and provides a significant improvement thereover.

SUMMARY OF THE INVENTION

A battery paste additive comprising micronized crystals of tetra basic lead sulfate and a method of producing the battery paste additive and battery plates is disclosed herein. The battery paste additive is added to a battery paste to promote and increase formation of tetra basic lead sulfate (TTBLS) crystals during paste mixing and curing. The battery paste additive may be used with conventional paste mixes and paste mixing and curing procedures and equipment to improve battery plate production and the resulting battery plates.

Accordingly, an object of the invention is to provide a battery paste additive comprising micronized tetra basic lead sulfate crystals.

Another object of the invention is to provide a battery paste additive that will reduce the time to cure the paste into the battery plate.

Yet another object of the invention is to provide a battery paste additive that may be used with conventional paste mixes and conventional mixing and curing procedures and equipment.

Yet another object of the invention is to provide a battery paste additive that improves the mechanical and physical strength of the resulting battery plate.

Yet another object of the invention is to create battery plates which are uniform in physical structure and quality.

Yet another object of the invention is to provide a battery paste additive allowing battery pastes and plates to be consistently reproducible.

Yet another object of the invention is to provide a battery paste additive which is used in battery pastes to produce plates that are cured in a reasonably consistent duration of time.

Yet another object of the invention is to provide a battery paste additive that may be used to produce positive battery plates.

Yet another object of the invention is to provide a battery paste additive which may be used to produce negative battery plates.

Yet another object of the invention is to provide a battery paste additive that reduces curing costs and capital costs associated with conventional curing procedures and curing chambers.

Numerous other objects, features and advantages of the present invention will become readily apparent from the detailed description and from the claims which follow.

BRIEF DESCRIPTION OF THE DRAWINGS

FIG. 1 is a chart of the components for the automotive and industry paste mixes for positive and negative plates to which the battery additive has been added.

FIGS. 2A and 2B are charts illustrating the results of the effect of 1% (by weight of lead oxide) of the battery paste additive on industrial paste and plate curing for a first sample;

FIGS. 3A and 3B are charts illustrating the results of the effect of 1% (by weight of lead oxide) of the battery paste additive on industrial paste and plate curing for a second sample;

FIG. 5 is a graph of the effect of 1% (by weight of lead oxide) of the battery paste additive for the sample of FIG. 3;

FIGS. 6A and 6B are charts illustrating the effect of 1% (by weight of lead oxide) of the battery paste additive on automotive paste and plate curing for a third sample;

FIG. 7 is a graph of the effect of 1% (by weight of lead oxide) of the battery paste additive for the sample of FIG. 6;

FIG. 8 is a chart of the effect of 1% (by weight of lead oxide) of the battery paste additive on automotive paste and plate curing for control samples without the additive;

FIG. 9 is a chart of the effect of 1% (by weight of lead oxide) of the battery paste additive on automotive paste and plate curing for a fourth sample;

FIG. 10 is a chart of the effect of 1% (by weight of lead oxide) of the battery paste additive on automotive paste and plate curing for a fifth sample;

FIG. 13 is a chart of the results of the effect of 1% (by weight of lead oxide) of the battery paste additive on fourteen paste mixes at the end of the curing cycle;

FIG. 14 is a chart of the results of standard industry rating tests for automotive batteries using batteries with and without the battery paste additive.

DETAILED DESCRIPTION OF THE PREFERRED EMBODIMENT

Figure 4:
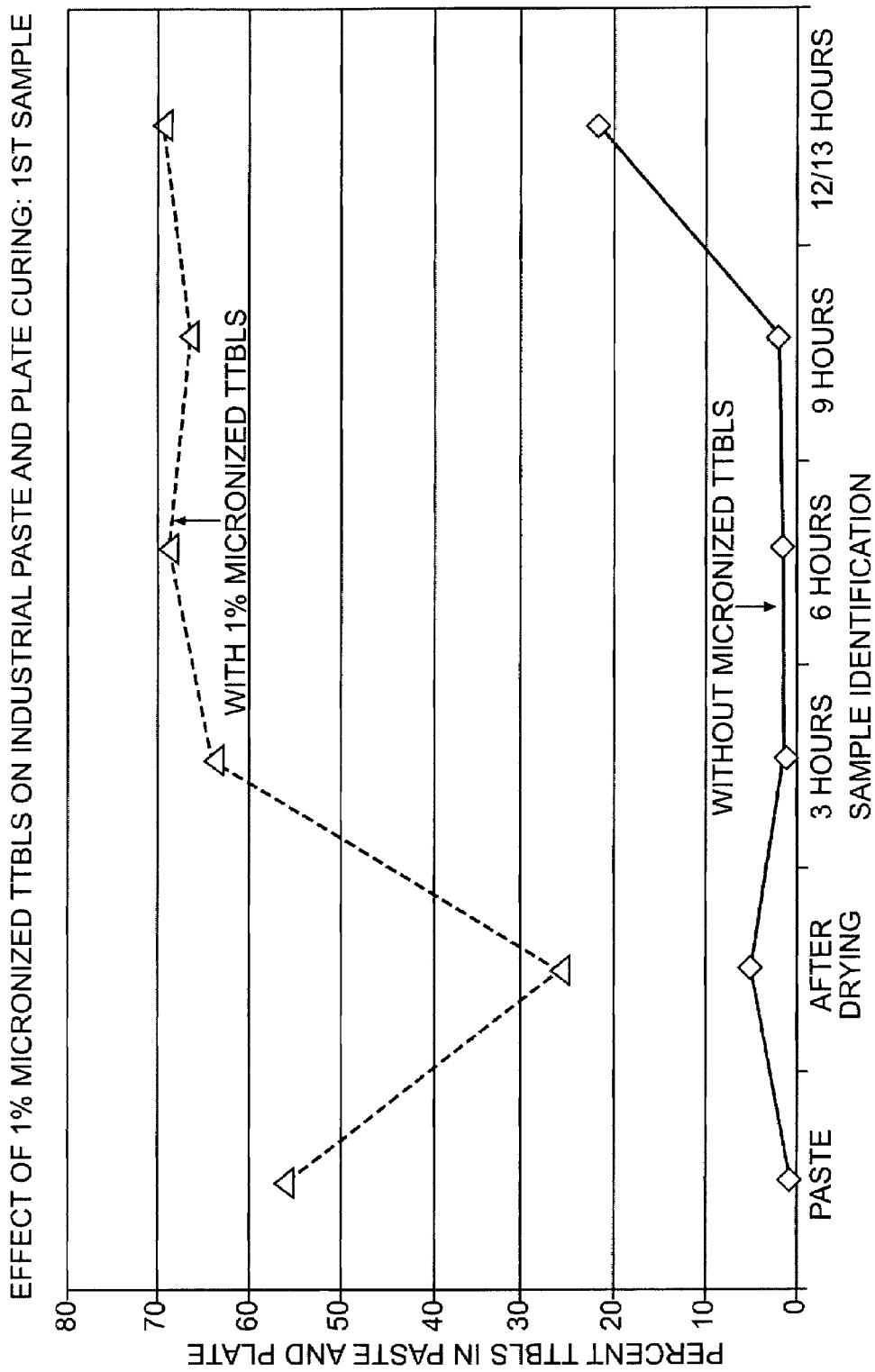
FIG. 4 is a graph of the effect of 1% (by weight of lead oxide) of the battery paste additive for the sample of FIG. 2.

While the invention is susceptible of embodiment in many different forms, there will be described herein in detail, preferred and alternate embodiments of the present invention. It should be understood however, that the present disclosure is to be considered an exemplification of the principles of the invention and is not intended to limit the spirit and scope of the invention and/or claims of the embodiments illustrated.

As disclosed herein, a battery paste additive is made and is then added to battery paste to improve the processing and the performance of battery plates. The battery paste additive comprises micronized tetra basic lead sulfate seed crystals, preferably with a median particle size from approximately 0.5 to 5.0 microns (preferably approximately one micron). These seed crystals are produced by a slow method of sulfuric acid addition to lead oxide, preferably in the form of HT-100 lead monoxide (99% or greater orthorhombic lead oxide raw material which is produced in a high temperature barton reactor followed by particle segregation via air classification, and due to its high reactivity, reacts with sulfuric acid and forms predominantly TTBLS crystals, resulting in a high percentage of TTBLS) and water to form TTBLS crystals which are subsequently centrifuged, dried and micromilled to produce micronized TTBLS crystals. The resultant battery paste additive is added to the paste during mixing, at a dosing level of approximately 0.25% to 5.00% of the weight of lead oxide in the mix, to accelerate and increase formation of tetra basic lead sulfate from tribasic lead sulfate in a battery paste, before curing. The micronized small crystals of tetra basic lead sulfate act as seeds or nucleation sites for formation of more TTBLS during paste mixing. The seed crystals eliminate the need for energy of crystallization, accelerating the conversion of tribasic lead sulfate to TTBLS.

Preferably, the above-described production of tetra basic lead sulfate crystals and milling process is used to produce micronized tetra basic lead sulfate crystals. The milling process breaks individual crystals into smaller particles. The resultant fine material of micronized TTBLS seed crystals may be used as a battery paste additive for greater production of TTBLS in the paste, as described in more detail below. Preferably, dry milling, without requiring the use of a grinding medium such as sand, is used to micronize the TTBLS crystals formed from the mixtures above. A hopper may be used to store and/or transfer the TTBLS product to the micromill. While a dry micromill process is described herein, any other methods known in the art for producing and/or separating fine particles of TTBLS may be used to produce the battery paste additive, so long as the advantages and features of the present invention are realized.

In the preferred embodiment of the present invention, after a first batch of micronized TTBLS crystals is made, a second batch of micronized TTBLS crystals is made in the same manner, except that the micronized TTBLS crystals form the first batch are added as a component in the second batch. The micronized TTBLS crystals initially produced by the above-described procedure (first batch) is then used as a component of a subsequent mixture. As described below, the subsequent mixture is the same mixture as the initial mixture, with the addition of micronized TTBLS crystals. Use of the initial micronized seed crystals from the first batch in the subsequent mixture (second batch) to produce the micronized TTBLS seed crystal additive performs essentially the same function that the micronized TTBLS seed crystal additive provides in the paste, promoting formation of TTBLS, and results in higher and more consistent purity of the TTBLS crystals produced. The resultant product of the subsequent mixture (second batch) may then be used as a battery paste additive. In an alternative embodiment, the initial mixture alone, without making the subsequent mixture, may be used as a battery paste additive.

Initial Mixture: In general, the production of the micronized tetra basic lead sulfate crystal additive uses an initial mixture of 1–90% (preferably approximately 75%), by total formula weight water, at a temperature between 0–100° C. (preferably between 50–100° C., and ideally approximately 90–100° C.); 10–70% (preferably approximately 15–20%) by total formula weight lead oxide; and 0.05–12% (preferably approximately 3–7%) by total formula weight dilute sulfuric acid ($H_2SO_4$) at a 1–99% concentration (preferably approximately at a 20–50% concentration, and ideally approximately at a 35% concentration). The sulfuric acid is added at two different times, as discussed below.

The initial mixture may be mixed in a reactor according to the following preferred procedure. The water is added to the reactor, mixing is begun, and the water is heated to the desired temperature, preferably approximately 90–100° C. The reactor water is then acidified with approximately 0.05–2.00%, preferably 0.05%, by total formula weight dilute sulfuric acid until the water is acidified at a pH of approximately equal or less than 2. The lead oxide is then added to the acidified water. Approximately 5–10%, preferably 5%, by total formula weight dilute sulfuric acid is then added to the mixture by a slow constant rate of sulfuric acid solution addition, as described below. Once sulfuric acid solution addition has completed, when the pH reaches approximately 9.5–8.5, the resultant initial mixture is centrifuged to remove excess water, the solid product is dried in a dryer, and then run through a hopper and a micromill to produce micronized TTBLS crystals. The resultant product is micronized TTBLS crystals. The dried sample may then be analyzed, and may also be analyzed prior to being run through the hopper and micromill.

Preferably, the micronized TTBLS product from the initial mixture or first batch above is then used in a subsequent mixture or second batch to produce the micronized TTBLS crystals paste additive. The subsequent mixture (second batch) and procedure is identical to the initial mixture, except for the addition of 0.01–5.00% by total formula weight, preferably 0.01%, micronized TTBLS from the initial mixture (first batch), preferably added after the addition of lead oxide and prior to the addition of sulfuric acid, to the mixture. The same procedure described for the initial mixture (first batch) is followed in the subsequent mixture (second batch). The dried, micromilled product of the subsequent mixture (second batch) may then be used as a battery paste additive. Use of the micronized crystal product form the initial mixture (first batch) in the subsequent mixture (second batch) promotes formation of TTBLS, resulting in a higher percentage of TTBLS crystals (or purity) and more consistent purity of the TTBLS crystals produced then the micronized TTBLS produced from the initial mixture. Alternatively, the micronized TTBLS product from the initial mixture may be used as the battery paste additive.

Sulfuric Acid Solution Addition: The following procedure is preferable for both the initial and subsequent mixtures described above. The initial weight of sulfuric acid and the weight of the sulfuric acid in the reactor is recorded and monitored at incremental periods of time, preferably every half hour. With the temperature at approximately 90–100° C., sulfuric acid solution addition using approximately 35% sulfuric acid is commenced and proceeds at a constant rate for approximately 2.5–4 hours. The total amount of sulfuric acid used in the addition process is approximately 5% by total formula weight.

Preferably, the sulfuric acid is added to the water/lead-oxide mixture slowly, at a constant rate of approximately 30–40 lbs/hour, preferably 30 lbs/hour, with vigorous mixing such that the rate of sulfuric acid addition allows for the formation of tetra basic lead sulfate. This slow addition of dilute acid favors the formation of tetra basic lead sulfate due to the localized in-situ stoichiometry providing an excess of lead oxide (PbO) molecules. By providing an environment rich with excess lead oxide molecules and dispersing the sulfuric acid rapidly due to vigorous mixing, a limited number sulfuric acid molecules favor formation of tetra basic lead sulfate, with each sulfuric acid molecule bonding with five (5) PbO molecules, as shown in the chemical reactions below. An addition rate of sulfuric acid which is too rapid may result in the formation of tribasic lead sulfate rather than tetra basic lead sulfate, as illustrated below.

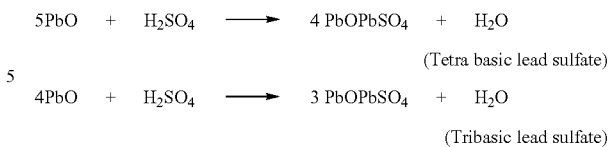

$$5PbO + H_2SO_4 \longrightarrow 4\,PbOPbSO_4 + H_2O$$
(Tetra basic lead sulfate)

$$4PbO + H_2SO_4 \longrightarrow 3\,PbOPbSO_4 + H_2O$$
(Tribasic lead sulfate)

After approximately two hours of sulfuric acid addition, the temperature, pH and weight of the sulfuric acid are monitored. The pH should preferably be approximately 10–11. After approximately 2.5 hours of sulfuric acid addition, the reactor batch may be sampled every fifteen minutes to check the pH. The sulfuric acid addition is preferably stopped when the pH is approximately 8.5–9.5. The resultant TTBLS crystal product may be sampled and analyzed for properties including the amount of lead, pH and X-ray diffraction (XRD) analysis to measure the amount of lead sulfate and lead oxide in the sample. The product is then centrifuged, dried in drying pans and in a drier and analyzed for properties including particle size and humidity. Larger particles may be micromilled again to produce TTBLS crystals of the desired size.

The reaction of lead oxide (PbO) with sulfuric acid ($H_2SO_4$) is exothermic and it is preferable to avoid boiling temperatures, such as those exceeding approximately 99–101° C. as foaming and batch overflow may result. If the temperature exceeds approximately 99–101° C., cool water may be applied until the temperature drops to below approximately 95–99° C.

Preferably, the resultant dried TTBLS micronized seed crystals will have a lead content of approximately 90.5–93.3% lead oxide by weight and a TTBLS content of approximately 90% or more TTBLS by weight. The lead content of the product may be measured by EDTA titration and may be used to determine that the proper ratio of sulfuric acid has been added. The TTBLS content may be measured by x-ray diffraction and may be used to determine the purity of the product. The resultant TTBLS product will also preferably have approximately 1.0% wt/wt or less moisture/humidity by weight, and a median particle size of approximately 0.5–5.0 microns, preferably one micron or less, and an appearance in color of tan yellow. TTBLS may discolor or blacken when exposed to ultraviolet light. It is therefore preferable to avoid extended exposure to UV light including sun and indoor lighting.

Although, a particular form of lead oxide, HT-100, which is high in orthorombic lead oxide, is preferred to produce the micronized seed crystals, any form of lead monoxide may be used. The resultant battery paste additive, when added to battery paste produces plates and batteries which have an increased battery life and performance, improved plate strength, and the processes for producing the additive and incorporating it into a battery paste are easily reproducible.

Although the addition of sulfuric acid to the initial and subsequent mixtures is preferably at a slow constant rate, such as that described above, other methods of sulfuric acid addition are foreseen, such as additions of sulfuric acid in multiple intervals, a slower rate of addition with less dilute sulfuric acid and/or a faster rate of addition with more dilute sulfuric acid. In addition, a continuous process in which sulfuric acid and lead oxide are combined into a continuous unbroken stream, eliminating the need for batch processing.

Although the procedure for micronizing the TTBLS crystals preferably requires centrifugation, drying, a hopper and a micromill, other methods of micronizing the TTBLS product are foreseen, such as crystal growth modification, sheer pumps, homogenization mills, cryogenic grinding and/or air classification. The use of other chemicals such as sodium sulfate is not required to produce a small particle size for the paste additive.

The resultant micronized TTBLS may be used as a battery paste additive by mixing approximately 0.25–5.00%, preferably approximately 1.0%, by weight of the lead oxide in the paste mix of the micronized TTBLS additive with conventional paste mixes using conventional paste mixers, pasting machines, tunnel dryers and curing chambers under standard conditions using standard manufacturing mixing and curing procedures.

Use of Micronized TTBLS Additive in Paste Mixing and Curing

Preferably, the amount of micronized TTBLS crystals added to the paste mix is approximately equal to 1.0% by weight of the lead oxide in the paste mix. An amount of micronized TTBLS crystals approximately equal to 1.0% by weight of the lead oxide in the paste mix is sufficient for use in both positive and negative plate paste mixes. The micronized TTBLS additive promotes and increases the formation of more TTBLS in the paste. TTBLS formation occurs during mixing, pasting and/or curing. The reaction conditions determine the rate of formation of TTBLS during each of the mixing, pasting and curing stages. The rate of formation is dependent on factors such as the temperature and time to prepare the paste mix.

Conventional paste mixing generally occurs at a temperature of approximately 45–65° C. In conventional paste mixes, TTBLS generally is not formed because this temperature is too low. The present invention allows formation of TTBLS in the paste during paste mixing at these low temperatures, as low as approximately 50° C. Due to the paste additive, a substantial amount of TTBLS will be formed during the paste mixing even at a low temperature, reducing or eliminating the need for TTBLS formation during the curing process.

In conventional paste mixes, at temperatures lower than 60° C., additional formation is necessary during the curing process. Generally, tetra basic lead sulfate will also be formed at temperatures lower than approximately 60° C. and can take place at approximately 40° C. However, at lower temperatures the rate of formation is reduced and the amount in the finished paste is also reduced. This can be offset by increasing the mixing time. This, however, increases the time to produce a paste mix beyond the 20–30 minute range preferred by the battery industry.

In conventional curing, temperatures of approximately 70–80° C. are required for formation of TTBLS. The present invention permits temperatures as low as 50° C. to be used during curing. The present invention may also be used at higher temperatures, resulting in more rapid formation of TTBLS than in conventional pastes. Preferably, the battery pastes containing the TTBLS additive are cured at a temperature approximately equal to or less than 50° C.

Plates made from pastes containing the additive may be stacked or separated, but are not required to be separated, during the curing process. The use of a polymer to bind TTBLS crystals in the paste is not required.

The preferred embodiment of the invention may be used in a variety of battery applications, including but not limited to automotive and industrial battery plate production. The preferred embodiment of the present invention may be used with positive or negative battery pastes for production of either positive or negative battery plates.

The additive produces more TTBLS in the paste, speeds up conversion of TRBLS to TTBLS and improves plate to plate reproducibility. As a result of the decreased curing time required due to the additive, fewer curing chambers are required to meet battery plate production requirements.

FIG. 1 is a chart identifying the amounts of each of the components of four lead-acid battery plate paste mixes prepared using the methods and additive described herein. The examples in FIG. 1 illustrate the addition of the above described battery paste additive to paste mixes for automotive and industrial battery plates in lead-acid batteries. For the automotive positive plate paste mix, the specific gravity of the sulfuric acid in the mixture examples is preferably approximately 1.400 and the paste density is typically in the range of approximately 4.15–4.27 g/cc. For the automotive negative plate paste mix, the specific gravity of the sulfuric acid is preferably approximately 1.400 and the paste density is typically in the range of approximately 4.27–4.39 g/cc. For the industrial positive plate paste mix, the specific gravity of the sulfuric acid is preferably approximately 1.400 and the paste density is typically in the range of approximately 4.33–4.45 g/cc. For the industrial negative plate paste mix the specific gravity of the sulfuric acid is preferably approximately 1.400 and the paste density is typically in the range of approximately 4.45–4.57 g/cc.

The paste density is a measure of the composition of the paste and also of its suitability for being pasted by commercial paste mixing machines for the positive or negative plate paste mix. Paste density is determined by measuring the weight of paste required to fill a cup having constant volume of 50 cubic centimeters. The "flock" component in FIG. 1 is a fibrous material, usually composed of polyester, nylon or modacrylic fibers, that is added to the paste to increase the mechanical strength of the pasted plate. The "expander" component in FIG. 1 is usually a mixture of barium sulfate, carbon black and lignosulfate that is added to the negative paste to improve the performance and life of the negative plate.

Battery paste mixes of the type described in FIG. 1 were mixed and cured according to standard procedures using standard equipment with the exception of the addition of the additive. The particular mixes used and procedure for mixing and curing typically vary in the industry. The battery paste mixes in FIG. 1 represent typical paste mixes used in the industry with the exception of the addition of the additive. To each paste mix, the micronized TTBLS additive was added at 1% of the weight of lead oxide in the paste mix. The resultant industrial and automotive pastes and plates were tested at selected time intervals during the mixing and curing process against a control sample without the battery paste additive, the results of which are shown in FIGS. 2–11. The control samples were produced from a standard paste mix without the battery paste additive. The resultant pastes and plates were tested using x-ray diffraction for the presence of several phases including the percent of TTBLS, TRBLS, tetragonal lead oxide, orthorhombic lead oxide and free lead. The resultant paste mix and cured plates using the additive demonstrated accelerated curing properties and were determined to promote greater formation of TTBLS than in pastes without the additive.

The data in FIGS. 2–14 represent results from positive battery plate paste mixes containing the battery paste additive in an amount equal to approximately 1% by weight of the lead oxide. Similar results were achieved in tests of negative plate paste mixes.

As can be seen in FIGS. 2–14, the resultant battery pastes with the additive demonstrated improved characteristics over known battery paste compositions. FIGS. 2A, 2B and 3A, 3B show in chart form the results of the effect of 1% of the battery paste additive on industrial paste and plate curing for a first sample and a second sample, versus a control sample. FIGS. 2A and 2B present data for five trials as well as the averages of those trials. FIGS. 3A and 3B present data for the three trials of the paste with the additive as well as the averages, and one trial of the control sample. The charts shown in FIGS. 2A, 2B and 3A, 3B show the amount of the tetra lead oxide, ortho lead oxide, tetra basic lead sulfate and tribasic lead sulfate at varying periods during the paste mixing and curing process, measured in percent content amounts. FIGS. 3A and 3B also show the percent lead (Pb) content at varying periods during the paste mixing and curing process. The experimental samples demonstrated significantly higher tetra basic lead sulfate content at the time intervals between the end of paste mixing and during curing. As can be seen from the data in the figures, significantly greater TTBLS is formed during paste mixing, as well as during curing, in paste mixes containing the additive than those without the additive.

FIGS. 4 and 5 show in graph form the average results for the first and second samples respectively of the effect of 1% micronized TTBLS on industrial paste and plate curing versus the control sample, and show the percentage of tetra basic lead sulfate present in the paste and plate at varying periods during mixing and curing. The results of FIGS. 4 and 5 demonstrate a significantly higher percent of TTBLS in the paste and plate during curing in the samples containing the TTBLS crystal additive.

FIGS. 6A and 6B show in chart form the effect of 1% of the battery paste additive on automotive paste and plate curing of a third sample. The charts shown in FIGS. 6A and 6B show the amount of the tetra lead oxide, ortho lead oxide, tetra basic lead sulfate and tribasic lead sulfate at varying periods during the paste mixing and curing process, measured in percent content. FIGS. 6A and 6B also show the percent lead (Pb) content at varying periods during the paste mixing and curing process. The experimental samples having the additive demonstrated significantly higher tetra basic lead sulfate content at the time intervals between the end of paste mixing and during curing, for various trials, as well as the averages for those trials.

FIG. 7 shows in graph form the average results for a third sample of the effect of 1% micronized TTBLS on automotive paste and plate curing versus the control sample, and shows the percentage of tetra basic lead sulfate present in the paste and plate at varying periods during mixing and curing. The results of FIG. 7 demonstrate a significantly higher percent of TTBLS in the paste and plate during curing in the sample containing the TTBLS crystal additive.

FIGS. 9–10 show in chart form the effect of 1% of the battery paste additive on automotive paste and plate curing of a fourth sample and a fifth sample, versus a control sample in FIG. 8. The charts shown in FIGS. 8–10 show the amount of tetra lead oxide, ortho lead oxide, tetra basic lead sulfate and tribasic lead sulfate at varying periods during the paste mixing and curing process, measured in percent content. FIGS. 8–10 also shows the percent lead (Pb) content at varying periods during the paste mixing and curing process. The control samples in FIG. 8 represent different samples taken from the same paste mix at different times. The experimental samples having the additive (FIGS. 9 and 10) demonstrated significantly higher tetra basic lead sulfate content than the control sample (FIG. 8), at the time intervals between the end of paste mixing and during curing, for various trials.

Figure 11:
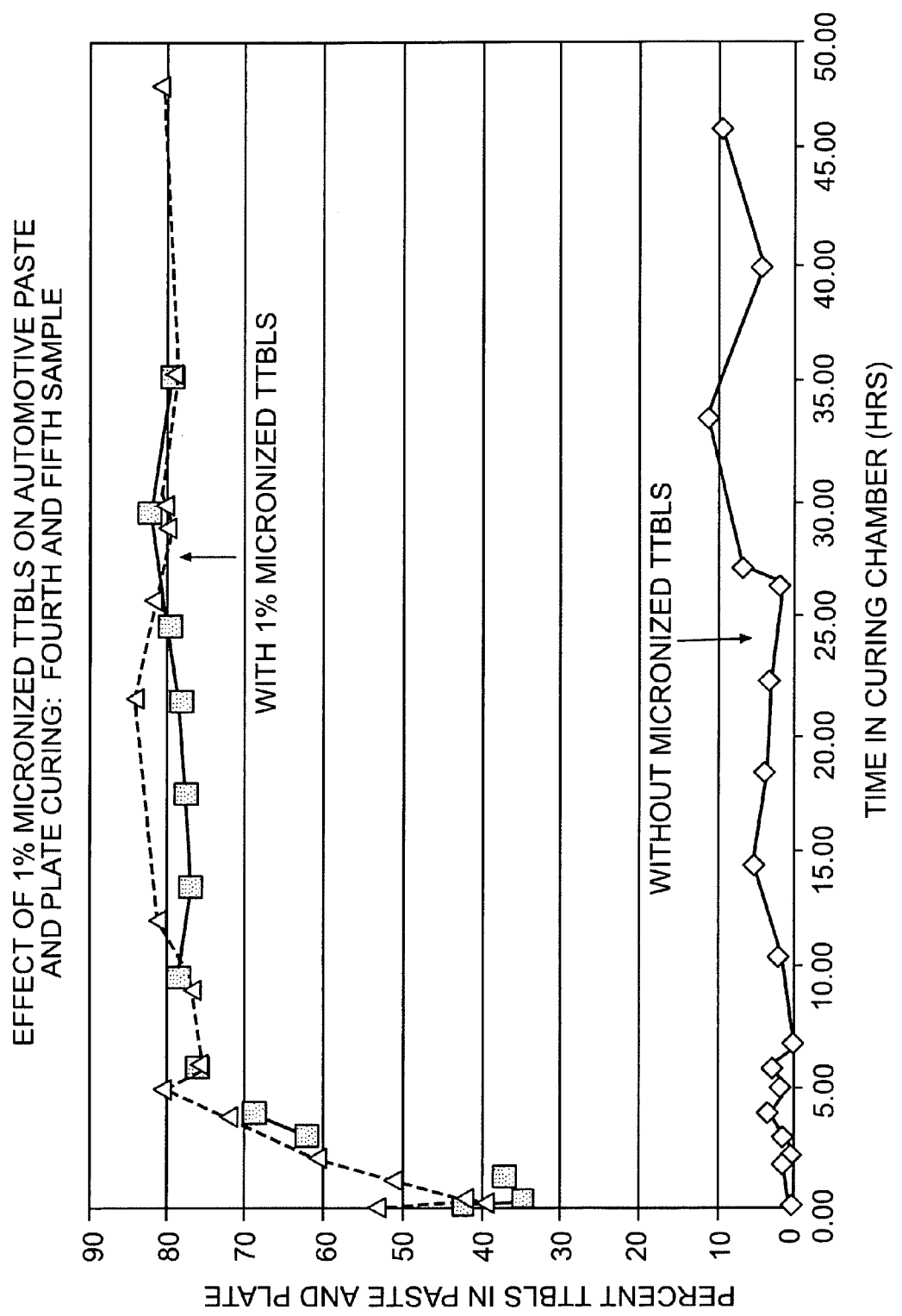
FIG. 11 is a graph of the effect of 1% (by weight of lead oxide) of the battery paste additive for the fourth and fifth samples in FIGS. 9–10, compared to the control sample of FIG. 8.

FIG. 11 shows in graph form the results for the effect of 1% micronized TTBLS on automotive paste and plate curing for a fourth and fifth sample, and show the average percentage of tetra basic lead sulfate present in the paste and plate at varying periods during mixing and curing. The results shown in FIG. 11 demonstrate a significantly higher percent of TTBLS in the paste and plate in the paste and during curing in samples containing the TTBLS crystal additive. FIG. 11 shows the results of two trials of a paste mix with the additive and one trial of a paste mix without the additive. As can be seen from the results of the two trials of the mix with the additive, the results were highly reproducible, and each had significantly higher percentages of TTBLS than the control sample.

Figure 12:
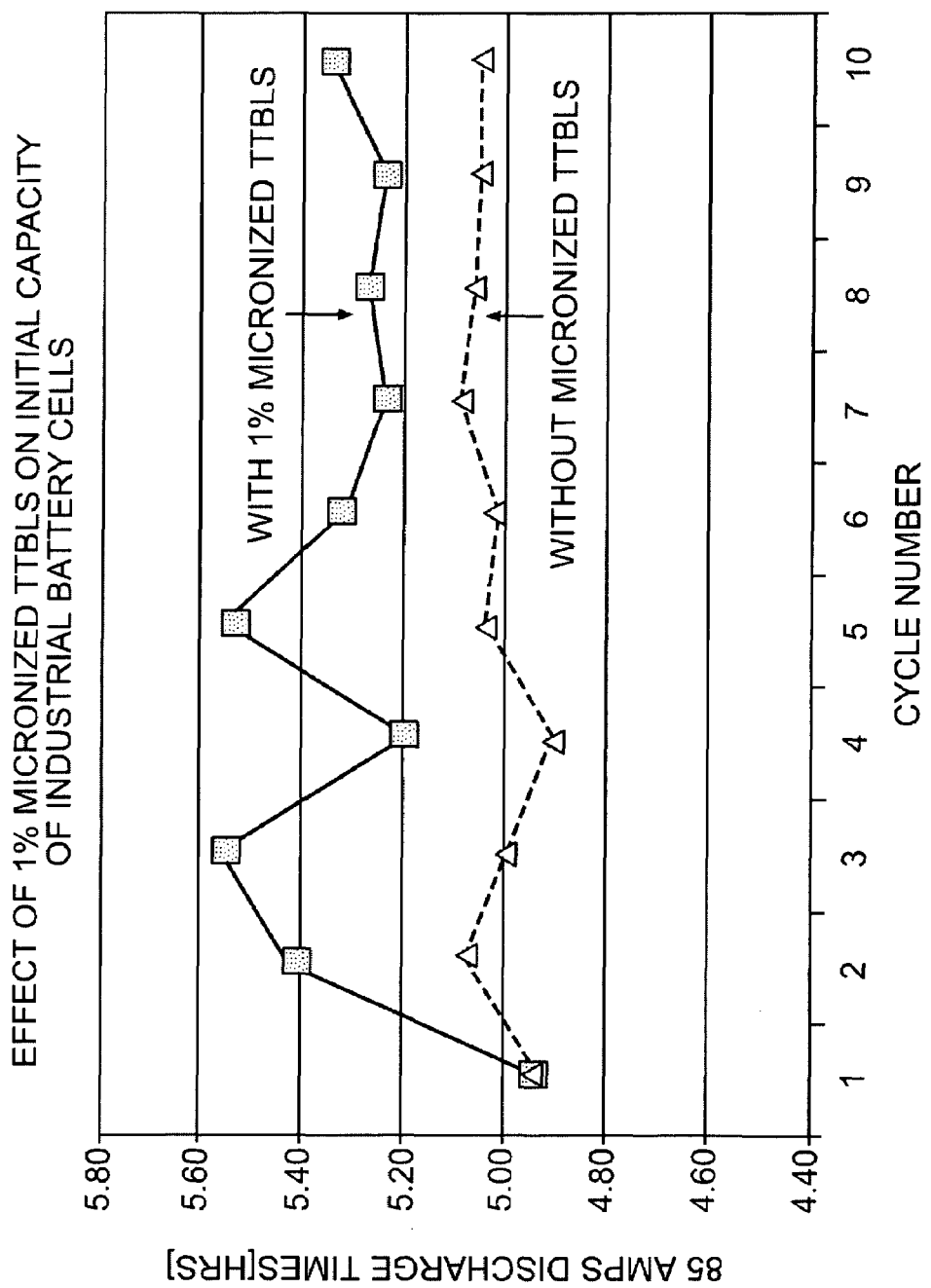
FIG. 12 is a graph of the effect of 1% (by weight of lead oxide) of the battery paste additive on the initial capacity of industrial battery cells.

FIG. 12 shows the effect of 1% micronized TTBLS on initial capacity of motive power industrial battery cells, versus a control sample, tested at the 5-hour rate of discharge (the current drain (85 Amps) that will completely discharge a typical battery in five hours) rate. It can be seen that the capacity of the cells containing 1% micronized TTBLS is superior to those where conventional plates and paste formulas were used. A cycle is a battery discharge followed by a recharge.

FIG. 13 shows the results of 14 separate paste mixing, pasting and curing tests carried out for industrial paste mixes, demonstrating excellent reproducibility of the process. The paste mixes used are similar to the paste mixes described in FIG. 1, although variations of the mix formulas would give similar results. The tests were taken from the finished plates at the end of the curing process after twenty-four hours.

FIG. 14 shows a comparison of test data from three automotive batteries that were produced with the TTBLS additive and three automotive batteries without the TTBLS additive, and the average values for first, second and third reserve capacity, first, second and third cold cranking amps, and ampere hours at a 20 hour rate. It can be seen that the Cold Cranking Amperes, Reserve Capacity and 20-hour Rate Capacity were all improved in the batteries containing 1% micronized TTBLS additive in the paste used to produce the positive plates. The performance of automotive batteries is likewise improved when 1% micronized TTBLS additive is used in a negative paste mix for production of negative plates. These tests are standard industry rating tests for automotive batteries and are specified by the Battery Council International for testing automotive batteries.

In summary, as can be seen from the foregoing tests of the amounts of TTBLS and free lead oxide present in the battery paste mix at timed intervals during the mixing and curing process, the present invention produces highly favorable results, while at the same time overcoming the disadvantages and/or shortcomings of known battery paste materials. Such results are an improvement over known prior art battery pastes and battery paste materials, as well as the methods for producing the same.

The foregoing specification describes only the preferred embodiment and alternate embodiments of the invention. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A method of producing an additive for a battery plate paste, comprising the steps of:
   mixing together water and lead oxide;
   mixing sulfuric acid into the water and lead oxide mixture; and
   reacting the mixture of water, lead oxide and sulfuric acid in the presence of a seed amount of tetra basic lead sulfate to create TTBLS crystals.

2. The method of claim 1, further comprising the step of micronizing the TTBLS crystals.

3. A method of producing an additive for a battery plate paste, comprising the steps of:
   mixing together water and a lead oxide complexing agent to create a first substance;
   mixing together the first substance with a tetra basic lead sulfate complexing agent to create a second substance;
   mixing together the second substance with a sulfuric acid complexing agent to create TTBLS crystals.

4. The method of claim 3, wherein the sulfuric acid is dilute.

5. The method of claim 3, wherein the sulfuric acid is added at a slow constant rate, with vigorous mixing.

6. The method of claim 3, wherein the lead oxide is high in orthorhombic lead oxide content.

7. The method of claim 3, further comprising the steps of: micronizing the TTBLS crystals.

8. The method of claim 3, further comprising the steps of:
   centrifuging the TTBLS crystals;
   drying the TTBLS crystals; and
   placing the TTBLS crystals through a micromill to create micronized TTBLS crystals.

9. The method of claim 3, wherein the sulfuric acid adjusts the pH of the first substance.

10. The method of claim 3, wherein the lead oxide comprises lead monoxide.

11. The method of claim 3, wherein the TTBLS crystals comprise approximately 1–90% by total formula weight water, approximately 0.05–20% by total formula weight sulfuric acid, approximately 10–70% by total formula weight lead oxide, and approximately 0.01–5.00% by total formula weight tetra basic lead sulfate.

12. The method of claim 11, wherein approximately 1–2% of said sulfuric acid is added to the water to lower the pH of the water to approximately equal or less than 2.

13. The method of claim 12, wherein approximately 5–10% by total formula weight sulfuric acid is added to the first substance.

14. A method of producing a battery paste, said method comprising the steps of:
   mixing together a lead oxide complexing agent and a tetra basic lead sulfate complexing agent to create a first substance;
   mixing together water and a sulfuric acid complexing agent to create a second substance;
   mixing together the first substance with the second substance to create TTBLS crystals;
   micromilling the TTBLS crystals to create a battery paste additive;
   mixing together the battery paste additive with a battery paste mix.

15. A method of producing a battery plate paste, comprising the steps of:
   creating a micronized tetra basic lead sulfate by reacting a mixture of:
   lead oxide;
   sulfuric acid; and
   water;
   in the presence of a seed amount of tetra basic lead sulfate; and
   incorporating the micronized tetra basic lead sulfate into a battery paste mix.

16. A method of making a battery paste additive comprising the step of reacting a mixture of:
   water;
   lead oxide; and
   sulfuric acid;
   in the presence of a seed amount of tetra basic lead sulfate.

17. The method of claim 16, wherein the mixture comprises approximately 1–90% by total formula weight water, approximately 0.05–20% by total formula weight dilute sulfuric acid, approximately 10–70% by total formula weight lead oxide, and approximately 0.01–5.00% by total formula weight tetra basic lead sulfate.

18. The method of claim 16, further comprising the step of mixing the additive into a battery paste to promote the formation of tetra basic lead sulfate in the battery paste.

19. A method for making a battery plate, comprising the steps of:
   mixing micronized tetra basic lead sulfate with a battery paste mix to create battery paste, wherein the tetra basic lead sulfate is produced by reacting a mixture of:
   lead oxide;
   sulfuric acid; and
   water;
   in the presence of a seed amount of tetra basic lead sulfate; and
   curing the battery paste.

20. The method of claim 1, wherein the lead oxide is in the form of orthorhombic lead monoxide produced in a high temperature barton reactor followed by particle segregation via air classification.

21. The method of claim 3, wherein the lead oxide complexing agent is in the form of orthorhombic lead monoxide produced in a high temperature barton reactor followed by particle segregation via air classification.

22. The method of claim 14, wherein the lead oxide complexing agent is in the form of orthorhombic lead monoxide produced in a high temperature barton reactor followed by particle segregation via air classification.

23. The method of claim 15, wherein the lead oxide is in the form of orthorhombic lead monoxide produced in a high temperature barton reactor followed by particle segregation via air classification.

24. The method of claim 16, wherein the lead oxide is in the form of orthorhombic lead monoxide produced in a high temperature barton reactor followed by particle segregation via air classification.

25. The method of claim 2, wherein the TTBLS crystals have a median particle size of approximately 0.5 to 5.0 microns.

26. The method of claim 7, wherein the TTBLS crystals have a median particle size of approximately 0.5 to 5.0 microns.

27. The method of claim 8, wherein the TTBLS crystals have a median particle size of approximately 0.5 to 5.0 microns.

28. The method of claim 14, wherein the micromilled TTBLS crystals have a median particle size of approximately 0.5 to 5.0 microns.

29. The method of claim 15, wherein the micronized tetra basic lead sulfate has a median particle size of approximately 0.5 to 5.0 microns.

30. The method of claim 16, further comprising the step of micromilling the battery paste additive to a median particle size of approximately 0.5 to 5.0 microns.

31. The method of claim 19, wherein the micronized tetra basic lead sulfate has a median particle size of approximately 0.5 to 5.0 microns.

32. The method of claim 14, wherein the step of mixing together the battery paste additive with a battery paste mix comprises the step of adding the battery paste additive to the battery paste mix at a dosing level of approximately 0.25% to 5.00% of the weight of lead oxide in the mix.

33. The method of claim 15, wherein the step of incorporating the micronized tetra basic lead sulfate into a battery paste mix comprises the step of adding the micronized tetra basic lead sulfate to the battery paste mix at a dosing level of approximately 0.25% to 5.00% of the weight of lead oxide in the mix.

34. The method of claim 18, wherein the step of mixing the additive into a battery paste comprises the step of adding the additive to the battery paste at a dosing level of approximately 0.25% to 5.00% of the weight of lead oxide in the mix.

35. The method of claim 19, wherein the step of mixing the micronized tetra basic lead sulfate with a battery paste mix comprises the step of adding the micronized tetra basic lead sulfate to the battery paste mix at a dosing level of approximately 0.25% to 5.00% of the weight of lead oxide in the mix.

* * * * *